United States Patent
Devis et al.

(10) Patent No.: US 10,996,647 B2
(45) Date of Patent: May 4, 2021

(54) METHOD FOR CONFIGURING AND METHOD FOR CONTROLLING AN INTERFACE OF HOME AUTOMATION EQUIPMENTS

(71) Applicant: SOMFY ACTIVITES SA, Cluses (FR)

(72) Inventors: Frédéric Devis, Epagny (FR); Isabelle Duchene, Mariginer (FR); Claudia Rety, Saint Sigismond (FR); Michael Danis, Annecy (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 15/552,900

(22) PCT Filed: Feb. 23, 2016

(86) PCT No.: PCT/FR2016/050414
§ 371 (c)(1),
(2) Date: Aug. 23, 2017

(87) PCT Pub. No.: WO2016/135412
PCT Pub. Date: Sep. 1, 2016

(65) Prior Publication Data
US 2018/0032048 A1 Feb. 1, 2018

(30) Foreign Application Priority Data
Feb. 23, 2015 (FR) ..................... 15/51507

(51) Int. Cl.
*G05B 19/042* (2006.01)
*G05B 15/02* (2006.01)
*G05B 23/02* (2006.01)

(52) U.S. Cl.
CPC ......... *G05B 19/0426* (2013.01); *G05B 15/02* (2013.01); *G05B 23/0216* (2013.01); *G05B 2219/2642* (2013.01)

(58) Field of Classification Search
CPC ............ G05B 19/0426; G05B 23/0216; G05B 2219/2642
(Continued)

(56) References Cited

U.S. PATENT DOCUMENTS 8,788,072 B2  7/2014 Van Herk
9,354,774 B2* 5/2016 Mairs .................. G06F 3/04817
(Continued)

FOREIGN PATENT DOCUMENTS

CN       101692255      4/2010
CN       102124416 A    7/2011
(Continued)

OTHER PUBLICATIONS

English Abstract to EP 2 196 877.
(Continued)

*Primary Examiner* — Robert E Fennema
*Assistant Examiner* — Marzia T Monty
(74) *Attorney, Agent, or Firm* — Cantor Colburn LLP

(57) ABSTRACT

Method for configuring, commanding and/or controlling a command and/or control interface (IN) of devices of a home automation installation, comprising the following steps: (E1) collecting a set of status queries (E) relating to at least one possible status of at least one home automation device (3), (E2) constituting a selection of at least one status query (SeIE) of the set of status queries (E), (E3) configuring an interface element (IN) on the basis of the selection of the at least one status query (SeIE), in such a way as to trigger transmission of a collection request (RC) comprising the selection, and obtaining, for each status query (E) of the selection, of at least one corresponding status indication (IDC) relating to at least one current status.

12 Claims, 4 Drawing Sheets

(58) Field of Classification Search
USPC .......................................................... 700/275
See application file for complete search history.

(56) References Cited

U.S. PATENT DOCUMENTS

| | | | |
|---|---|---|---|
| 10,365,531 B2 | 7/2019 | Shrivastave et al. | |
| 10,402,295 B1* | 9/2019 | Beiriger | G06F 11/3013 |
| 2010/0141602 A1 | 6/2010 | Duchene et al. | |
| 2012/0158205 A1* | 6/2012 | Hinman | G05B 23/0216 |
| | | | 700/297 |
| 2012/0316687 A1* | 12/2012 | Chen | H02J 3/008 |
| | | | 700/276 |
| 2014/0316580 A1 | 10/2014 | Roux et al. | |
| 2016/0103918 A1* | 4/2016 | Alekseyev | G06F 16/2428 |
| | | | 715/810 |

FOREIGN PATENT DOCUMENTS

| | | |
|---|---|---|
| CN | 104335595 A | 2/2015 |
| EP | 2196877 A1 | 6/2010 |
| WO | 2013068400 A1 | 5/2013 |

OTHER PUBLICATIONS

International Search Report for Application No. PCT/FR2016/050414.
CN First Search Application No. 2016800113897.
CN Office Action for Application No. 2016800113897.
English Machine Translation CN Office Action for Application No. 2016800113897.
English Machine Translation First CN Office Action for Application No. 2016800113397.
English Machine Translation of Abstract for CN101692255.
First CN Office Action for Application No. 2016800113897.
Written Opinion for Application No. PCT/FR2016/050414.
English Translation for Written Opinion for Application No. PCT/FR2016/050414.

* cited by examiner

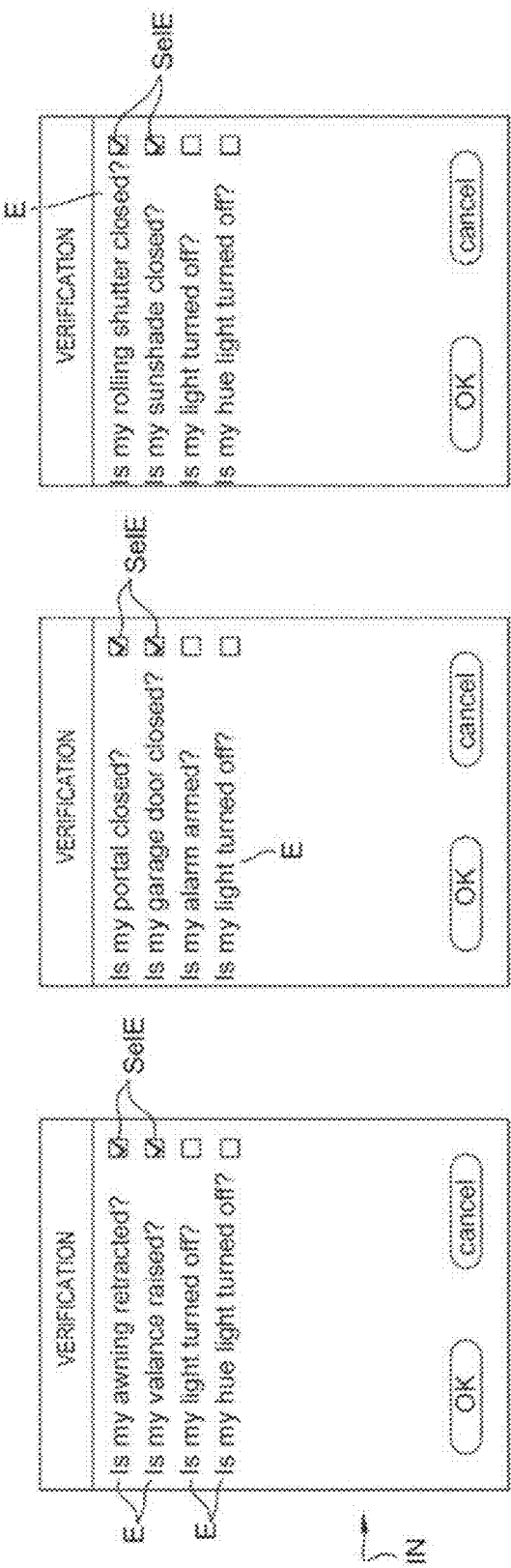

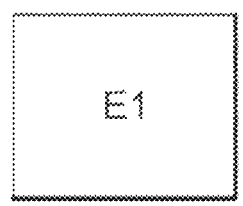
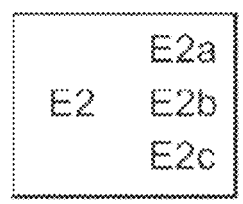
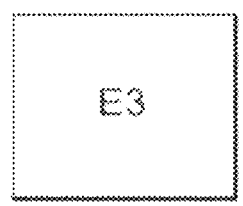
Fig. 7

METHOD FOR CONFIGURING AND METHOD FOR CONTROLLING AN INTERFACE OF HOME AUTOMATION EQUIPMENTS

CROSS REFERENCE TO RELATED APPLICATIONS

This application is a National Stage of PCT Application No. PCT/FR2016/050414 filed on Feb. 23, 2016, which claims priority to French Patent Application No. 15/51507 filed on Feb. 23, 2015, the contents each of which are incorporated herein by reference thereto.

TECHNICAL FIELD

The present invention concerns a method for configuring a control interface of home automation equipments or sensors of a home automation installation of a building, a method for commanding such a control interface configured in accordance with the aforementioned configuration method, a control interface, as well as a home automation installation incorporating such a control interface.

BACKGROUND

It is known to use home automation equipments, for example, actuators arranged to displace or modify the setting of an element of the building, such as a shutter or a lighting device or still an alarm system.

An actuator may also comprise a sensor.

It is known to use a central entity of the home automation installation intended for home automation equipments or for sensors. This central entity is thus configured to gather information coming from the home automation equipments, for example their positions, if they are operating, in stand-by mode, etc., and from the sensors.

The central entity is also provided with values of physical quantities coming from the sensors. This set of information coming from the home automation equipments and from the sensors defines the overall situation of the building and of the home automation installation.

The central entity is also arranged to exchange data with a remote server. This server also allows relaying the data toward other central entities capable of communicating therewith.

Managing the set of information coming from the home automation equipments and from the sensors seems therefore to be a crucial element for detecting an abnormal operation or an unexpected situation, such as a window left open or a lighting device left turned on.

Nonetheless, verifying the status of each home automation equipment and each sensor turns out to be tedious and difficult to establish in a regular or targeted manner. Under these conditions, it seems difficult to rapidly obtain particular information on the home automation installation or on the building considered as useful by a user.

BRIEF SUMMARY

The present invention aims to solve all or part of the aforementioned drawbacks.

To this end, the present invention concerns a method for configuring a control interface of home automation equipments or sensors of a home automation installation of a building comprising at least the following steps:

collecting a set of status queries relating to at least one possible status of at least one home automation equipment, constituting a selection of at least one status query of the set of status queries, configuring an element of the interface on the basis of the selection of the at least one status query, so as to trigger, in response to an interaction of a user with said element of the interface:

the emission of a collection request toward a central entity of the home automation installation, the collection request comprising the selection of the at least one status query, and the acquisition, for each status query of the selection of the at least one status query, of at least one corresponding status indication relating to at least one actual status of at least one home automation equipment.

A set of status queries relating to possible statuses of home automation equipments and of sensors of a home automation installation may comprise a considerable number of status queries.

Indeed, a home automation installation may comprise a multitude of home automation equipments and of sensors which may in turn comprise a multitude of possible statuses.

A home automation equipment such as a shutter may for example present statuses such as: fully open, fully closed, open between 10 and 20%, inclined by an angle comprised between 5° and 20° with respect to vertical, etc.

Under these conditions, the configuration method allows the user to determine beforehand the possible statuses on which he wants to have a feedback in particular. The user may, for example, select a status query to determine whether a shutter is fully closed because he is only interested in a feedback on this status.

Once constituted, the selection corresponds to a restricted subset of possible status queries which are pertinent in the eyes of the user of the control interface.

The configuration method further provides an element of the interface which is arranged to respond in the event of a request from the user. The implementation of this configuration method therefore allows a user to have a control interface allowing him to directly recover the actual status indications corresponding to the prior selection of status queries.

From the user viewpoint, the pertinent actual status indications are recovered rapidly without having to process actual indications he is not interested in. From the installation viewpoint, these arrangements allow saving resources and transferring or displaying bare minimum of necessary data.

The configuration method therefore allows returning status indications corresponding to a selection coming from home automation equipments, such as actuators, as well as from sensors.

In the case of a sensor, a status query of the selection may be for example: «does the opening detector actually notice that a window (or door) is closed» or «do the opening detectors actually notice that the windows (or doors) are closed».

This status query allows determining whether a window is potentially open, taking into account that, nowadays, the conventional window motorization in the residences does not exist or barely exists. The use of sensors is therefore advantageous to return actual statuses of elements of the building which are not equipped with actuators.

According to an aspect of the invention, the status indication relating to at least one possible status of at least one home automation equipment or of at least one sensor may correspond to a battery level or to the presence of a defect diagnosed by the home automation equipment or the sensor.

According to an aspect of the invention, the element of the interface comprises one or several button(s) or a tactile command portion.

According to an aspect of the invention, the step of constituting a selection of at least one status query comprises at least the following steps of: displaying status queries of the set of status queries, designating at least one status query among the displayed status queries, generating the selection of the at least one status query, from the at least one status query designated among the displayed status queries.

According to an aspect of the invention, the step of displaying status queries of the set of status queries and the step of designating at least one status query, consists in displaying on the control interface an indication relating to at least one status query and in a designation action, for example by contact on a tactile portion of the interface or a button of the interface.

According to an aspect of the invention, said method comprises a step of selecting at least one default status query.

The default selection step allows a user to have status queries selected by default if he has not intervened during the configuration method. This arrangement may be useful, for example, if a user does not want to take part in the selection but still want to be able to subsequently benefit from a recovery of actual status indications limited to the major elements of the home automation installation.

The present invention also concerns a method for controlling a control interface of home automation equipments or sensors of a home automation installation of a building comprising at least the following steps:

carrying out a configuration of the control interface by applying a configuration method as described hereinbefore, emitting a collection request toward the central entity of the home automation installation, the collection request comprising the selection of the at least one status query, obtaining, for each status query of the selection of the at least one status query, at least one corresponding status indication relating to at least one actual status of at least one home automation equipment or at least one sensor.

When the configuration has been carried out beforehand by implementing the configuration method, the control method may be executed rapidly and without requiring a particular effort from the user.

Indeed, the user must ensure that a collection request is emitted and afterward that the expected actual status indications are obtained with no further effort. In particular, the user has no sorting to do among the status indications he receives because he has already configured the control interface to receive only the information he is interested in. In terms of installation, these arrangements also allow saving resources, in particular the energy necessary to collect the information and transmit it toward the command interface, and allow limiting the amount of communication frames.

According to an aspect of the invention, said control method further comprises a step of establishing an overall status information from the at least one corresponding status indication.

According to an aspect of the invention, the step of obtaining at least one corresponding status indication relating to at least one actual status is followed by a display step, for example, subsequently to a display request originating from a user or in the form of an automatic or parametrizable notification showing up on a display portion of the interface.

The present invention further concerns a computer program product comprising code instructions arranged to implement the steps of a configuration method as described hereinbefore, when said program is executed by a processor of the control interface.

According to an aspect of the invention, said computer program product is arranged in the form of an application downloadable on said control interface.

The present invention also concerns a control interface comprising in memory the code instructions of a computer program product as described hereinbefore and arranged to execute such a computer program product, said control interface being arranged to be configured by applying a configuration method as described hereinbefore.

According to an aspect of the invention, said interface comprises a terminal, in particular a smartphone or a tablet, said terminal comprising a data input device and a display device The present invention further concerns a home automation installation of a building comprising a plurality of home automation equipments or sensors, a central entity comprising a module of communication with at least one home automation equipment or at least one sensor among the plurality of home automation equipments or sensors, and a control interface as described hereinbefore arranged to communicate with said central entity or integrated to said central entity.

BRIEF DESCRIPTION OF THE DRAWINGS

Anyway, the invention will be better understood using the following description with reference to the appended schematic drawings representing, as a non-limiting example, an embodiment of this configuration method and of this command and/control method:

FIG. 2 is a diagram presenting the functional links between the elements of the home automation installation illustrated in FIG. 1, the home automation installation comprising, in particular, a server and a control interface;

FIGS. 3a to 3c are front views of the control interface during the execution by a downloadable application of a method for configuring the control interface illustrated in FIG. 2;

FIG. 7 is a flowchart of the steps of the configuration method.

DETAILED DESCRIPTION

In the following detailed description of the figures defined hereinabove, the same elements or the elements filling identical functions may preserve the same references so as to simplify the understanding of the invention.

Figure 1:
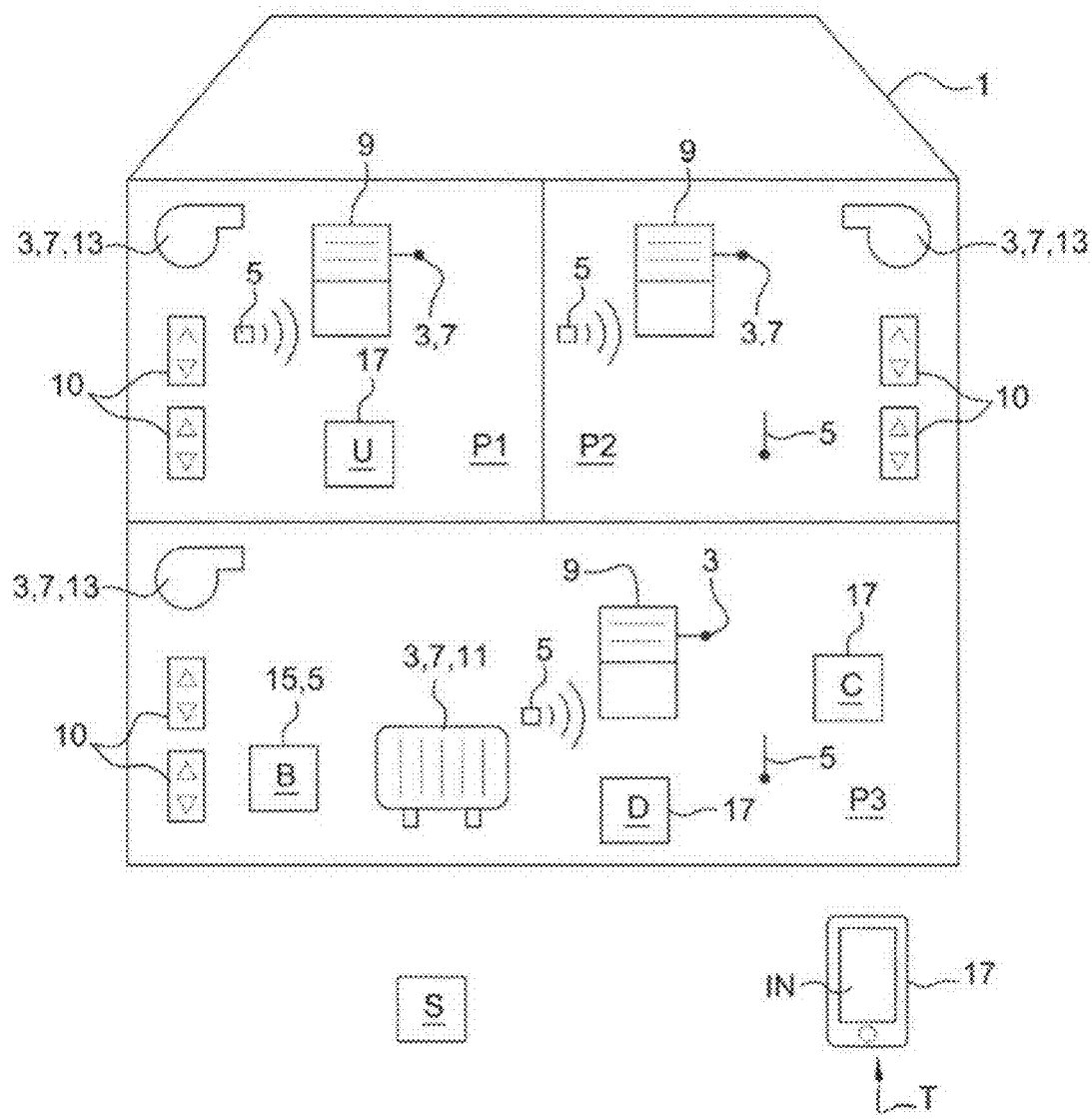
FIG. 1 is a schematic view of a building and of a home automation installation in accordance with an embodiment of the invention.

As illustrated in FIG. 1, a building 1 comprises three rooms P1, P2, P3. The building 1 also comprises home automation equipments 3 and sensors 5, each sensor 5 being arranged to measure a physical quantity, for example a temperature or a moisture level, or arranged to determine the position of an element of the building 1, such as the open status of a rolling shutter 9.

A home automation equipment 3 may consist of an actuator 7 arranged to displace or set an element of the building 1, for example an actuator 7 for displacing a rolling shutter 9 or a regulation system 10 for a heater 11 or a ventilation system 13.

The home automation installation 17 may also comprise a command unit 15 for commanding an actuator 7, such as a wireless command box B for the rolling shutter 9.

The home automation installation 17 may comprise one or several sensor(s) 5, in an integrated manner, to an actuator 7, to a command unit 15 or to the command box B or, in an independent manner, to these elements. In particular, a sensor 5 may consist of a temperature sensor, a lightsensor or a humidity sensor. Position sensors 5 of home automation equipments 3 of the building 1 such as, for example, position sensors of a door leaf such as a window, whether motorized or not, may also be provided.

A home automation equipment 3 and a sensor 5 should thus be considered as entities having information on observed actual statuses of elements of the building 1 and being capable of sharing this information with other elements of the home automation installation 17.

The home automation equipments 3 and the sensors 5 can thus have access to any measurable physical quantity, such as the temperature of each room P1, P2, P3 or a status of an element of the building 1, such as the open status of a rolling shutter 9, the status of an alarm, etc.

A home automation installation 17 is arranged to group together all data coming from the home automation equipments 3 and to process this data.

The home automation installation 17 comprises a central entity U arranged to control all the home automation equipments 3 remotely, in particular using a wireless communication protocol, for example a radio communication protocol.

The home automation installation 17 further comprises a mobile communication terminal T provided with a control interface IN allowing to display information or data as detailed later on.

As represented in FIG. 2, the central entity U is arranged to communicate with a server S.

The central entity U is disposed on a private network PN, whose access is generally protected by a firewall FW. The server S is also disposed on a private network SN. The private network PN is linked to a wide area network N, for example the Internet.

In particular, the central entity U of the home automation installation 17 comprises a processing unit 2 arranged to contain and execute a first computer program.

As example, the processing unit 2 comprises a processor, a storage flash memory as well as a random access memory, and an Ethernet chip.

The central entity U further comprises at least one communication module 2' intended to control or command home automation equipments 3 or sensors 5, the home automation equipments 3 may consist of actuators 7 or an alarm system.

As example, as represented in FIG. 2, the communication module 2' enables the control and command of at least one actuator 7, of a movable element of the building 1, such as for example a rolling shutter 9.

There is also provided the reception of information from a sensor 5 supplying information on the presence of a user or values of the surrounding parameters such as temperature, humidity and luminosity. In the same manner, the central entity U may enable the control of an alarm system.

The central entity U further comprises a module 4 of communication with the server S. The server S enables the remote control and comprises a processing unit 102 arranged to contain and execute a second computer program.

The server S further comprises at least one communication interface 104 intended for the communication with the central entity U.

The server S may also comprise a communication interface 106 intended for the communication with a control interface IN.

For example, the control interface IN comprises a web server 107 and a mobile communication terminal T communicating via a wide area network N. For example, the mobile communication terminal T may consist of a smartphone or a tablet.

The control interface IN comprises a processor which may be disposed at the level of the web server 107 or the mobile communication terminal T.

The processor of the control interface IN is arranged to use a third computer program. In turn, this third computer program is arranged to execute a downloadable application.

The mobile communication terminal T comprises a data input device and a display device, for example in the form of a tactile command portion of a screen of the terminal T and in the form of one or several button(s) of the terminal T.

The downloadable application presents a display at the level of the screen of the terminal T, as represented in FIGS. 3a to 6. The execution of the downloadable application will be presented in more details hereinbelow according to the steps of a method for configuring and a method for controlling the interface IN.

It should be noted that there may be provided one or several downloadable application(s), the use of several applications allowing taking into consideration the distinct sets of status queries corresponding to portions of the building 1 or to distinct themes, such as, for example, the home automation equipments 3 or sensors 5 associated to the terrace, the home automation equipments or the sensors associated to the door leafs, and the home automation equipments 3 or the sensors 5 associated to the accesses of the building 1 or of the enclosure of the building 1.

Alternatively, the same application may comprise several windows relating to different themes or different portions of the building 1.

These methods concern the recovery and the display on the screen of the control interface IN of information on actual statuses of home automation equipments 3 and sensors 5 of the home automation installation 17.

As illustrated in FIG. 7, the configuration method comprises a first step E1 consisting in collecting a set of status queries E relating to possible statuses of home automation equipments 3 or sensors 5.

The considered home automation equipments 3 and sensors 5 are arranged to communicate with the central entity U. The central entity U and the server S thus know all the possible statuses which may be considered for these different home automation equipments 3 and sensors 5.

As example, a status query may be an indication or an information regarding a feedback of a home automation equipment 3 on its position or its setting, such as the position of a rolling shutter 9 or the setting of a thermostat of a heater 11.

A status query E may also concern a charging level of a battery of a home automation equipment 3 or a defect diagnosed at the level of a home automation equipment 3.

A status query E may be in the form of an interrogative sentence or question, thereby allowing to facilitate the understanding and the selection by a user.

A status query E regarding a sensor 5 may be an indication regarding the measured value of a physical quantity in the building 1, such as a temperature or a moisture level. It may also be an indication on the position of an element of the building 1, for example if the sensor 5 is a position sensor of a window. The corresponding status query E may thus relate to the open position of the window.

The use of sensors 5 to return information of the building 1 is particularly interesting to determine the actual status of elements of the building 1 which do not comprise an actuator 7.

This is the case of non-motorized windows to which a position sensor may be associated, in order to determine the open or closed status of a window.

A second step E2 consists in constituting a selection of at least one status query SeIE among the set of status queries E.

First of all and as illustrated in FIGS. 3a to 3c, status queries E are displayed, during step E2a, on the control interface IN.

Afterward, a user proceeds to the designation of at least one of the displayed status queries E. In the presented embodiment, the designation action corresponds to a contact on the tactile portion of the control interface IN to tick a box corresponding to the selected status query SeIE.

FIGS. 3a to 3c represent the display of three applications during the display and designation phases, respectively corresponding to three distinct themes: the door leaves—FIG. 3a, the access—FIG. 3b, the terrace equipments—FIG. 3c.

Finally, when the designation of at least one status query E is completed, the control interface IN is arranged to proceed to the generation, during step E2c, of the selection of at least one status query SeIE.

Alternatively, and if the user does not want to proceed himself to a manual designation, a default selection SeIE may be generated by the control interface IN.

For example, this selection SeIE may comprise the status queries which are the most likely to be chosen by a user or those which reflect major characteristics of the building 1 such as the closure or the opening of the door leaves or the alarm status.

Figures 4A, 4B:
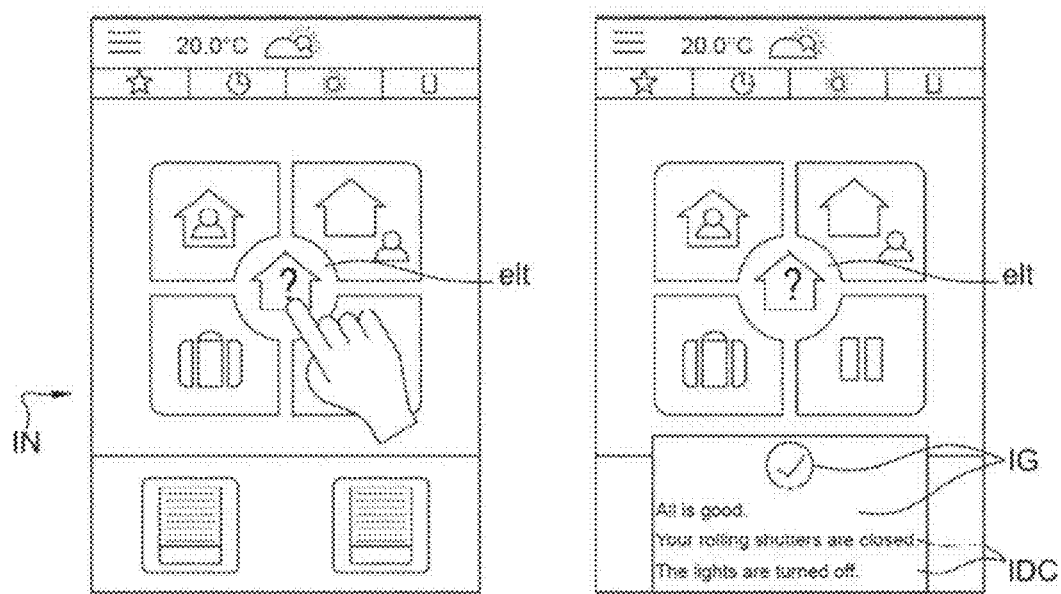
FIGS. 4a and 4b are front views of the control interface during the execution by the downloadable application of a method for controlling the control interface illustrated in FIG. 2.

A third step E3 consists of the configuration of an element ELT of the interface IN such as, for example, a portion of the tactile portion of the interface IN, as represented in FIG. 4a.

The presence of this element ELT allows a user to be potentially able to send a collection request RC toward the central entity U in order to recover corresponding status indications IDC relating to the selected status queries SeIE.

As illustrated in FIGS. 4a and 4b, a control method therefore consists, for a user, in interacting with the element ELT of the interface IN.

Hence, implementing the control method consists in a first step in carrying out a configuration according to the configuration method, so that the element ELT of the interface IN is accessible to a user and operational.

The user then emits a collection request RC toward the central entity U through a contact on the element ELT of the interface IN. Upon reception of this collection request RC, the central entity U emits corresponding status indications IDC relating to the selected status queries toward the interface IN.

As illustrated in FIG. 4b, the corresponding status indications IDC are displayed afterward. An overall information IG synthesizing the obtained corresponding status indications IDC may also be generated and displayed by the interface IN.

These arrangements allow saving resources and transferring little data. Indeed, rather than loading all the status indications of all the home automation equipments 3 and of all the sensors 5, only the corresponding status indications IDC in which the user is interested are loaded on the control interface IN.

The configuration method and the control method described herein allow recovering pertinent information and only this information in order to bring it to the attention of a user of a communication terminal T.

Implementing the control method is rapid when the configuration has been carried out beforehand. In addition, if the user does not proceed himself to the selection, status indications defined by default are sent thereto.

This configuration method therefore allows obtaining rapidly and automatically synthetic information on the situation of a building 1 at a specific time.

This method also allows carrying out verifications such as, for example, the open status of the rolling shutters 9 when the user goes on vacation or the status of the batteries of certain actuators 7. The user can thus check the corresponding status indications IDC in order to determine whether all the rolling shutters 9 are closed or whether the alarm is well activated.

Figures 5, 6:
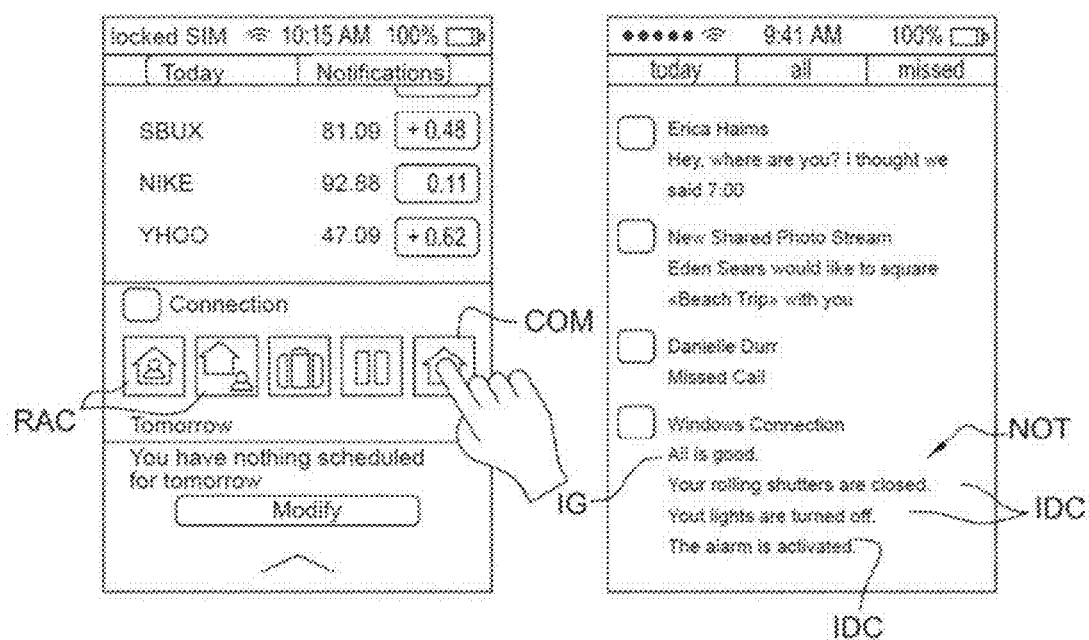
FIG. 5 is a front view of the control interface comprising icons for access to the downloadable application.
FIG. 6 is a front view of the control interface presenting a list of notifications one of which relating to the downloadable application.

In addition and as illustrated in FIGS. 5 and 6, the downloadable application may be associated to an interface element in the form of a command button COM intended to be integrated in a list of shortcuts RAC of the terminal T, for example of a mobile phone, in order to enable a direct access to the emission function of a collection request RC.

There is also provided, during the execution of the control method, a step of emitting and displaying a notification NOT. This notification NOT appears to recall the corresponding status indications IDC and the overall indication IG obtained after the emission of the last collection request RC.

Other notifications may also appear at the level of the control interface IN, subsequently to an update performed without any collection request RC, when the central entity U detects a modification of a corresponding status indication IDC and informs the control interface IN.

It goes without saying that the invention is not limited to the sole embodiment of this configuration method and of this command method, described hereinabove as example, but it encompasses on the contrary all the variants.

The invention claimed is:

1. A method for configuring a control interface of home automation equipment of a home automation installation of a building comprising at least the following steps:
   collecting a set of status queries relating to at least one possible status of at least one home automation equipment, the at least one home automation equipment being an actuator arranged to displace or modify a setting of an element of the building or an alarm system;
   selecting at least one default status query called default query selection;
   constituting the default query selection of at least one status query of the set of status queries, the default query selection of the at least one status query corresponding to a restricted subset of possible status queries, wherein the default query selection defines a configuration basis for an element of the control interface, the element being configured for later one-step acquisition of the restricted subset of possible status queries;

configuring the element of the control interface on the basis of the default query selection of the at least one status query, so as to trigger in a one-step acquisition realized after the step of constitution of the default query selection, in response to an interaction of a user with the element of the interface:

the emission of a collection request toward a central entity of the home automation installation, the collection request comprising the default query selection of the at least one status query;

the acquisition, for each status query of the default query selection of the at least one status query, of at least one corresponding status indication relating to at least one actual status of at least one home automation equipment.

2. The configuration method according to claim 1, wherein the step of constituting the default query selection of at least one status query comprises at least the following steps:

displaying status queries of the set of status queries;

designating at least one status query among the displayed status queries; and generating the default query selection of the at least one status query, from the at least one status query designated among the displayed status queries.

3. A method for controlling a control interface of home automation equipment of a home automation installation of a building comprising at least the following steps:

carrying out a configuration of the control interface by applying a configuration method according to claim 1;

emitting a collection request toward the central entity of the home automation installation, the collection request comprising the default query selection of the at least one status query; and obtaining, for each status query of the default query selection of the at least one status query, at least one corresponding status indication relating to at least one actual status of at least one home automation equipment.

4. The control method according to claim 3, wherein the method further comprises a step of establishing an overall status information from the at least one corresponding status indication.

5. A computer program product comprising a non-transitory computer readable medium having program instructions arranged to implement the steps of the method according to claim 1, when the computer program product is executed by a processor of the control interface.

6. The computer program product according to claim 5, arranged in the form of an application downloadable on the control interface.

7. A control interface comprising in memory the program instructions of the computer program product according to claim 5 and arranged to execute the computer program product.

8. The control interface according to claim 7, wherein the interface comprises a terminal, the terminal comprising a data input device and a display device.

9. The control interface according to claim 8, wherein the terminal is a smartphone or a tablet.

10. A home automation installation of a building comprising a plurality of home automation equipment, a central entity comprising a module of communication with at least one home automation equipment among the plurality of home automation equipment, and a control interface according to claim 7 arranged to communicate with the central entity or integrated to the central entity.

11. The configuration method according to claim 1, wherein the acquisition is realized only for the default query selection of the at least one status query.

12. A method for configuring a control interface of home automation equipment of a home automation installation of a building comprising at least the following steps:

collecting a set of status queries relating to at least one possible status of at least one home automation equipment, a home automation equipment being an actuator arranged to displace or modify the setting of an element of the building or an alarm system;

constituting a restricted selection of at least one status query of the set of status queries, the restricted selection corresponding to a restricted subset of possible status queries, wherein the restricted selection defines a configuration basis for an element of the control interface, the element being configured for later one-step acquisition of the restricted selection, wherein the step of constituting the restricted selection of at least one status query of the set of status queries comprises at least the following steps:

displaying status queries of the set of status queries;

designating at least one status query among the displayed status queries, wherein the step of displaying status queries of the set of status queries and the step of designating at least one status query, comprises displaying on the control interface an indication relating to at least one status query and in a designation action of at least one status query by contact on a tactile portion of the control interface or a button of the control interface;

generating the restricted selection of the at least one status query, from the at least one status query designated among the displayed status queries;

configuring the element of the control interface on the basis of the restricted selection of the at least one status query, so as to trigger in a one-step acquisition realized after the step of constitution of the restricted selection, in response to an interaction of a user with the element of the control interface:

the emission of a collection request toward a central entity of the home automation installation, the collection request comprising the restricted selection of the at least one status query; and the acquisition, for each status query of the restricted selection of the at least one status query, of at least one corresponding status indication relating to at least one actual status of at least one home automation equipment.

* * * * *